F. A. MARTOCCIO.
MACARONI MAKING MACHINE.
APPLICATION FILED APR. 25, 1910.

992,369.

Patented May 16, 1911.

WITNESSES
MMWalstrom
J.U.Byrnes

INVENTOR
FRANK A. MARTOCCIO
BY Paul & Paul
ATTORNEYS

UNITED STATES PATENT OFFICE.

FRANK A. MARTOCCIO, OF MINNEAPOLIS, MINNESOTA.

MACARONI-MAKING MACHINE.

992,369.  Specification of Letters Patent.  Patented May 16, 1911.

Application filed April 25, 1910. Serial No. 557,425.

*To all whom it may concern:*

Be it known that I, FRANK A. MARTOCCIO, of Minneapolis, Hennepin county, Minnesota, have invented certain new and useful Improvements in Macaroni-Making Machines, of which the following is a specification.

In the manufacture of macaroni it is customary to provide a die plate in the bottom of a cylinder through which the dough is forced by the pressure of a plunger in the cylinder. The dough is forced down through the die, the macaroni being delivered in tubular form ready to be cut up into suitable lengths for the drying trays. The dough passing through the die has to be kept warm to form tubes of the proper consistency and uniform in shape and length. Generally the plate has been surrounded by a body of water, but this has been found objectionable, as the walls of the holes through the die will not be uniformly heated, those at the periphery of the die and nearer the water being warmer than those near the middle of the die.

To obviate this objection to macaroni machines as usually constructed is the primary object of my invention.

The invention consists generally in arranging electric conductors between the die holes in the plate and passing a current of electricity therethrough so that all of the walls of the holes will be uniformly heated and the dough in consequence will be delivered at the underside of the plate in regular, uniform tubes of equal length.

Figure 1:
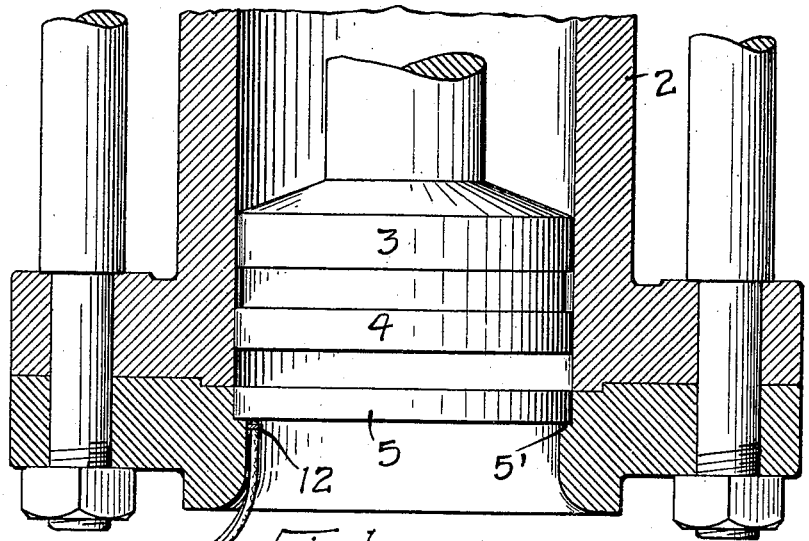
Figure 3:
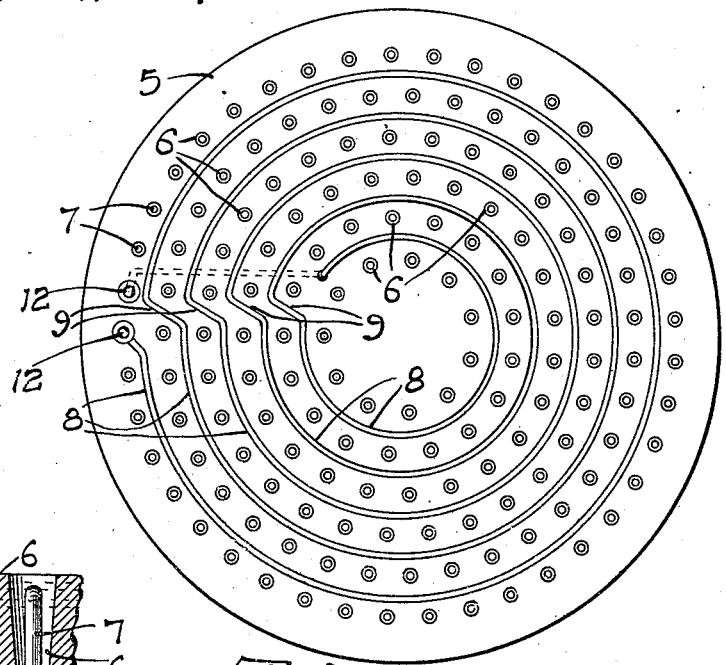
Figure 2:
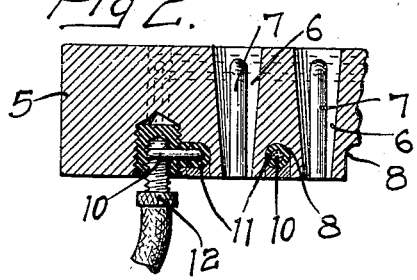

In the accompanying drawings forming part of this specification, Figure 1 is a sectional view of a portion of a macaroni machine with my invention applied thereto, Fig. 2 is a detail view illustrating the manner of placing the electric conductors in the die plate, Fig. 3 is a bottom view of the die plate.

In the drawing, 2 represents a portion of the machine cylinder, 3 a plunger therefor having a packing ring 4 and 5 is a die plate arranged in the open lower end of the cylinder on a seat 5'. This plate is normally stationary, but it may be readily removed at any time. It is provided with concentric circles of holes 6 extending from the center to the periphery of the plate. These holes are of suitable size and I provide pins 7, formed preferably by mounting staples in the walls around the die holes. These staples depend within the holes and serve to impart a tubular form to the dough forced through the die. Between the concentric circles of holes in the under surface of the plate I provide a series of concentric grooves 8, extending from the center to the periphery of the plate with branches 9 connecting each groove with the contiguous one. In these grooves or channels electric conductors 10 are laid, inclosed within a suitable insulation 11 so that the conductors will be thoroughly insulated from the die plate and the walls of the holes. Binding posts 12 are mounted on the periphery of the plate and whereto the inner and outer groove conductors are connected, so that when a current is admitted to the plate through one conductor, it will flow through all of them to the center of the plate and then out to the other binding post to complete the circuit. The conductors form a resistance to the electric current sufficient to create the desired heat, and as the conductors are arranged on both sides of the circle of holes in the die plate, it is evident that the walls of these holes will be heated at a uniform temperature, which can be easily and quickly controlled by the electric current. This uniform heating of the walls of the die holes results in a thorough and uniform heating of the dough and the formation of perfect tubes in the holes of the die plate which will be of substantially the same length when fed out at the bottom of the cylinder.

I do not wish to be confined to the size of the die plate or the arrangement of the holes therein, as both are capable of considerable modification, the essential feature being the construction of the plate which permits a uniform heating of the walls of the die holes. This plate, with suitable modifications, may be readily adapted for molding spaghetti, vermicelli, and the like.

I claim as my invention:—

1. In a machine for making macaroni, spaghetti, or vermicelli, a die plate having a series of holes therethrough and passages included between the upper and under surfaces of said plate and adapted to contain a heating agent and extending around and between said holes, and substantially a uniform distance from the walls of said holes whereby the walls of said holes will be uniformly heated.

2. A molding or die plate for macaroni, spaghetti, or vermicelli machines comprising a disk having a series of holes therethrough and electric conductors embedded in said disk and insulated therefrom contiguous to the walls of said holes, said conductors having terminals whereby an electric current may be passed through said plate and near said holes, for the purpose specified.

3. A molding or die plate for macaroni machines comprising a disk having a series of holes extending therethrough, said holes being arranged in concentric circles with spaces between the circles, said disk having annular grooves formed between the circles of holes, and branch grooves leading from one groove to the contiguous one, and electric conductors fitting within said grooves and insulated from the walls thereof and inclosing the circles of holes, said conductors having suitable terminals, substantially as described.

4. The combination, with a cylinder having an open end and a plate removably fitting therein, said plate having a series of holes therethrough and pins depending within said holes, the under surface of said plate having a series of grooves therein, between said holes, and electric conductors fitting within said grooves and insulated therefrom and in circuit with one another from the center toward the periphery of said plate, terminals mounted on said plate and connected with said conductors, and a plunger operating in said cylinder and forcing the dough through said plate, for the purpose specified.

5. In a machine for making macaroni, spaghetti, or vermicelli, a die plate having a series of holes therethrough, and electric conductors having terminals and arranged to conduct an electric current in proximity to said holes to uniformly heat the walls thereof.

6. In a machine for making macaroni, spaghetti and vermicelli, a die plate comprising a disk having a series of holes extending therethrough, said holes being arranged in concentric circles with spaces between the circles, said disk having annular grooves formed between the circles of holes, and branch grooves leading from one groove to the contiguous one, and said grooves being adapted to contain a heating agent and being located a uniform distance substantially from the walls of said holes, whereby said walls will be uniformly heated.

In witness whereof, I have hereunto set my hand this 20th day of April 1910.

FRANK A. MARTOCCIO.

Witnesses:
J. A. BYRNES,
G. E. SORENSEN.

Copies of this patent may be obtained for five cents each, by addressing the "Commissioner of Patents, Washington, D. C."